United States Patent [19]

Focke

[11] 4,367,618
[45] Jan. 11, 1983

[54] VARIABLE CAPACITY BUFFER STORAGE CONVEYOR FOR CIGARETTE PACKAGING APPARATUS

[76] Inventor: Heinz Focke, Moorstrasse 64, 309, Verden/Aller, Fed. Rep. of Germany

[21] Appl. No.: 188,418

[22] Filed: Sep. 18, 1980

Related U.S. Application Data

[63] Continuation of Ser. No. 48,117, Jun. 13, 1979, abandoned, which is a continuation of Ser. No. 929,051, Jul. 28, 1978, abandoned, which is a continuation of Ser. No. 550,797, Feb. 18, 1975, abandoned.

[30] Foreign Application Priority Data

Feb. 16, 1974 [DE] Fed. Rep. of Germany ....... 2407580

[51] Int. Cl.³ .............................................. B65B 11/30
[52] U.S. Cl. ........................................ 53/234; 53/148; 198/482; 198/488
[58] Field of Search ................. 53/148, 150, 236, 234, 53/579, 387, 388; 198/812, 347, 482, 488, 796

[56] References Cited

U.S. PATENT DOCUMENTS

| | | | |
|---|---|---|---|
| 1,351,025 | 8/1920 | Cooper | 53/234 |
| 2,378,324 | 6/1945 | Pay | 53/579 |
| 2,874,823 | 2/1959 | Zuercher | 198/812 X |
| 2,930,174 | 3/1960 | Moreno | 53/238 |
| 2,932,376 | 4/1960 | Millington | 198/463 |
| 3,251,449 | 5/1966 | Hoppmann | 198/812 |
| 3,282,760 | 11/1966 | Gutierrez | 53/388 |
| 3,448,846 | 6/1969 | Bardenhagen | 53/236 |
| 3,499,555 | 3/1970 | Wahle | 53/150 |
| 3,776,344 | 12/1973 | Harrison | 198/476 |
| 3,805,477 | 4/1974 | Kruse | 53/236 |

*Primary Examiner*—John Sipos
*Attorney, Agent, or Firm*—Sughrue, Mion, Zinn, Macpeak & Seas

[57] ABSTRACT

A variable capacity buffer storage device 20 is disposed in series between a metal foil wrapping unit 16 and a paper blank enclosing unit 18 in a cigarette packaging apparatus. The storage device is in the form of an endless belt conveyor 31 having a plurality of rectangular compartments 33 configured to receive a block of cigarettes enclosed in a folded but unglued metal foil wrapper to retain the folded flaps from opening. A movable pulley 44 can vary the length of the storage run of the conveyor in response to breakdowns of the input wrapping or output enclosing units.

8 Claims, 5 Drawing Figures

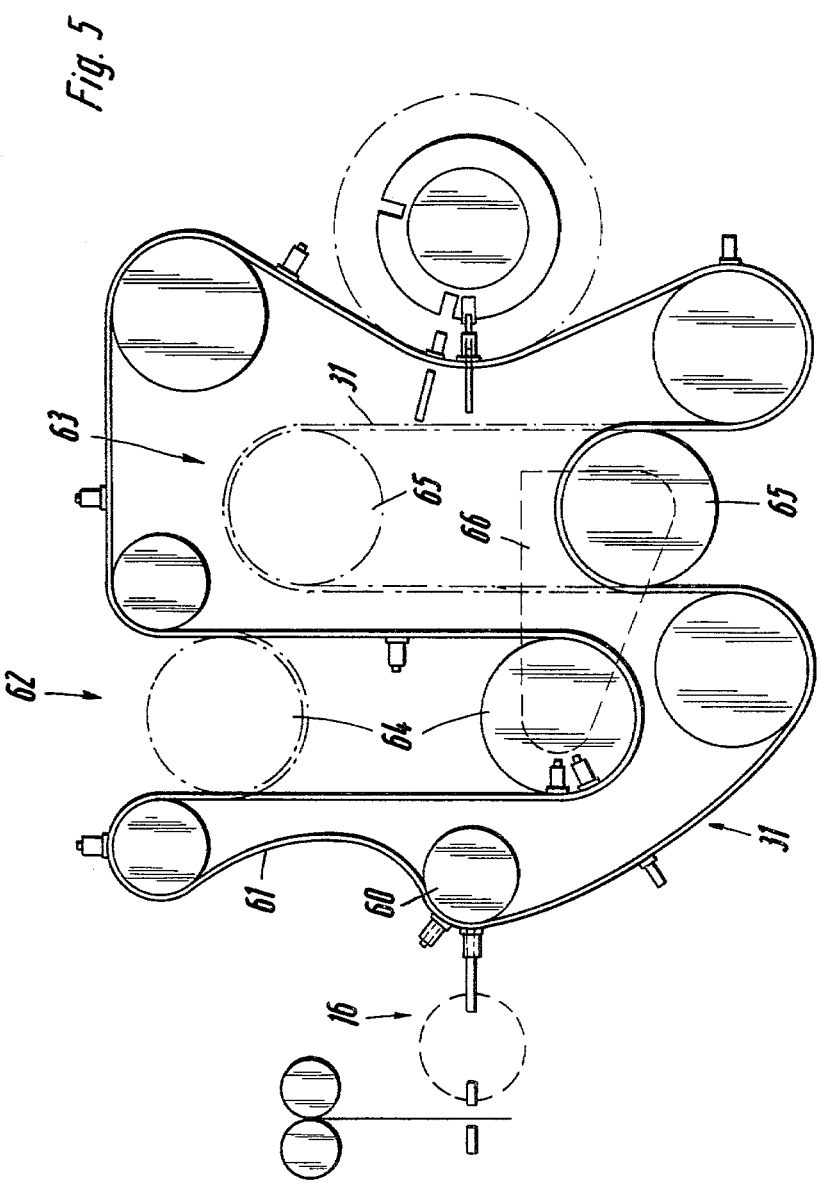

VARIABLE CAPACITY BUFFER STORAGE CONVEYOR FOR CIGARETTE PACKAGING APPARATUS

This is a continuation of application Ser. No. 048,117, filed June 13, 1979, now abandoned and which is a continuation of Ser. No. 929,051 filed July 28, 1978, now abandoned and which is a continuation of Ser. No. 550,797, filed Feb. 18, 1975 now abandoned.

BACKGROUND OF THE INVENTION

1. Field of the Invention

The present invention relates to an apparatus for producing and packaging cigarettes, etc. The apparatus comprises a cigarette production unit with a magazine connected thereto, a device for forming groups of cigarettes, a unit for wrapping the groups of cigarettes in a first inner blank (tin foil blank), a unit for wrapping the tin foil block in a paper blank, a hard box, etc., and a unit for wrapping the packs in an outer viscose foil blank.

2. Description of the Prior Art

A production and packaging line of this nature consists of a plurality of in part very complicated machines. In practice, disturbances which can critically disrupt the entire flow of production are particularly likely to occur after the groups of cigarettes have been wrapped in a first tin foil layer, that is, in the succeeding section of the production line.

To reduce the effect of such production line disruptions caused by breakdowns in individual units, it is general practice to connect a cigarette storage device in series with the cigarette magazine in the production line. This storage device receives a variable number of cigarettes from the production unit and supplies these as necessary to the magazine. When breakdowns occur in the production unit the quantity of cigarettes in the storage device is reduced and when breakdowns occur in the units connected after the storage device the quantity of cigarettes in the storage device is increased.

The most commonly used storage devices are so-called inclined storage devices which receive a number of cigarettes. These are in the form of individual containers which are placed on an empty magazine to discharge the cigarettes. Large storage devices are also known which enable a plurality of cigarettes to be continuously received and discharged. In the case of these known storage devices, particularly the large storage devices, there is a risk of damaging the cigarettes. In the first place, the cigarettes are subjected to relatively powerful mechanical stresses. In addition, the cigarettes are frequently soiled a great deal in the storage device. Another substantial disadvantage consists in that only a portion of the cigarettes can be continuously removed from the large storage device. As a result, a greater or lesser quantity of cigarettes is always left over in the large storage device and the quality of these cigarettes no longer meets the required standards. An especially serious disadvantage is that the cigarettes, which are stored in the open state in the large storage device, tend to dry out.

SUMMARY OF THE INVENTION

The present invention relates in general to the problems resulting from the large number of units connecting in series in the production, resp., packaging line, and, in particular, to the susceptibility of individual units to breakdowns. In this connection, a basic object of the invention is the storage of cigarettes.

The invention proceeds from the standpoint that the more or less rigid in-series connection of production or packaging units with, to some extent, vastly differing modes of operation and features, is the cause of frequent disruptions in the overall flow of the production line. Accordingly, the main object of the invention is to provide measures by means of which, in view of the susceptibility to breakdowns of individual units, the overall production-line flow is impaired as little as possible when breakdowns occur. In particular, the above-described disadvantages (page 3, para. 1) are obviated.

The invention consists in that an intermediate unit for interrupting the flow of products is connected between the unit for wrapping the groups of cigarettes in the first inner blank (formation of the tin foil block) and the succeeding unit for wrapping this tin foil block in the paper blank or the like.

The invention is based on the idea of making a break at a specific point in the production or packaging line which enables the flow of products to be stopped. According to the invention, this break is applied between a group of units having minimal susceptibility to breakdowns and a group of units having a high incidence of breakdowns. The latter consist of the units for wrapping the tin foil block in a paper blank or in a cardboard blank and for completing the packaging by applying a viscose foil layer. Experience has shown that these two units are especially susceptible to breakdowns. This is due, in particular, to the fact that glue is applied to the blanks being processed in these two units. The units disposed in front of the break and the unit for wrapping the groups of cigarettes in the first inner (tin foil) blank which, in terms of its mode of operation, belongs to the group of pure packaging units, are considerably less susceptible to breakdowns than the two above-mentioned units.

The interruption of the production flow by means of an intermediate unit can be effected in different ways. This intermediate unit can consist, for example, of a transfer path which makes this interruption possible. This transfer path can be constructed in various ways, for example, it may be designed to store the products or it may comprise a device for changing the rhythm of the succeeding units.

The present invention also relates to a novel method of storing cigarettes in a cigarette production and packaging system such as the one described above. This storage method is characterized in that the cigarettes are stored in groups corresponding to the finished packs, is, they are not stored individually. The above-mentioned intermediate unit is preferably used to store the cigarettes temporarily in the form of individual groups. These groups of cigarettes have already been wrapped in the first inner blank (tin foil blank). The advantage of this storage method is that the cigarettes in the inner wrapping are protected against mechanical stresses, drying out, etc. A specific advantage is that, at the end of a shift, when the entire packaging system is disconnected, the wrapped cigarette blocks can be left in the storage device. It is no longer necessary to empty the packaging apparatus completely.

According to one embodiment of the invention, the storage device for effecting the above method consists of a compartment chain with a plurality of successive compartments, each designed to receive a group of cigarettes wrapped in a blank. By means of an endless compartment chain, the groups of cigarettes are supplied in succession to a removal point, namely, the subsequent unit for inserting the groups of cigarettes in a paper blank or a hard box. The risk of having unused cigarettes left over is eliminated by this endless storage device with its continuously displaced endless chain.

The storage capacity of this storage device may be varied as necessary by means of one or more spare chain loops of variable length.

Other objects, features and advantages of the present invention will be made apparent in the following detailed description of various embodiments thereof which is provided with reference to the accompanying drawings.

BRIEF DESCRIPTION OF THE DRAWINGS

FIG. 5 is a side view of another embodiment of the storage device.

DESCRIPTION OF THE PREFERRED EMBODIMENTS

Figure 1:
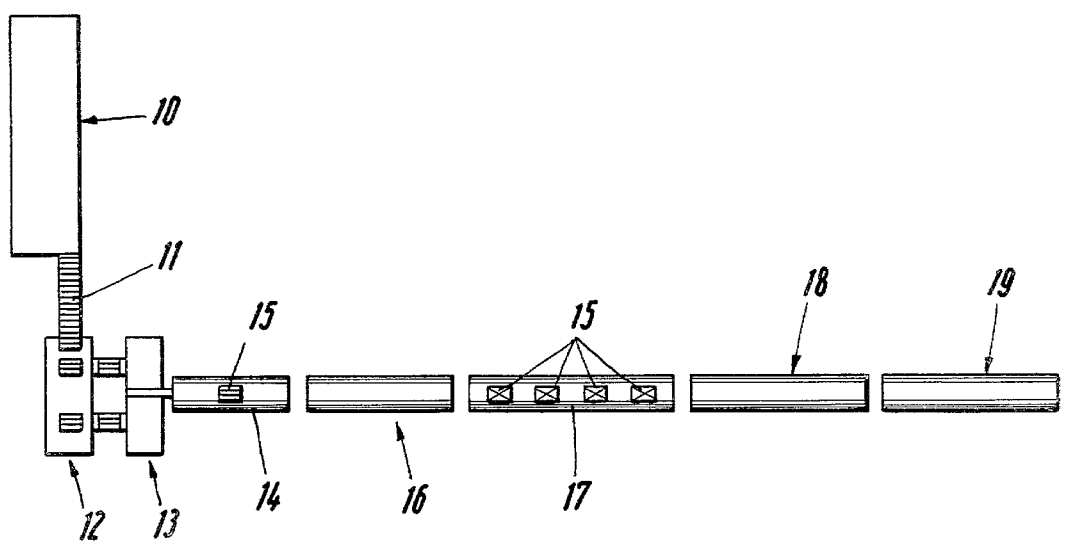
FIG. 1 shows a diagrammatic plan view of the features of the production and packaging system according to the invention.
Figure 2:
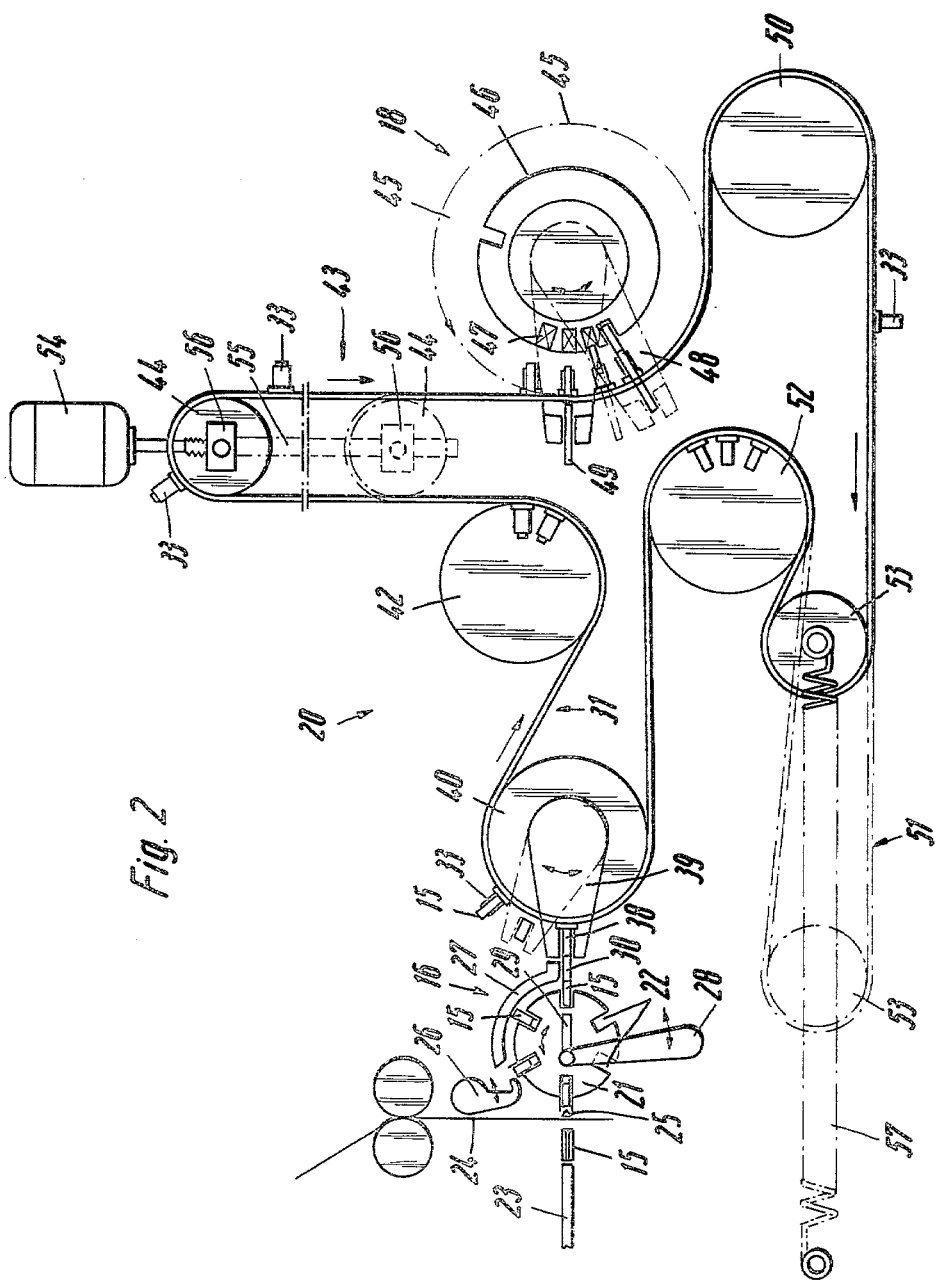
FIG. 2 is a side view, on an enlarged scale, of the storage device constituting the intermediate unit.

A cigarette production and packaging line is represented in diagrammatic form with corresponding reference numbers in FIG. 1. The cigarettes are produced in a production machine, for example, a conventional extrusion machine 10. The cigarettes are transported from the machine 10 by a conveying device, in this case, a conveyor belt 11, to a magazine 12, in conformity with systems of this type. The cigarettes are ejected from the magazine 12 in individual groups containing a corresponding number of cigarettes to the finished pack. In the present system, the magazine 12 is provided with an associated rotating checking device 13. In the compartments of the device 13 which are not represented individually, the cigarettes are checked by means of a tip test. The cigarettes which are now in groups 15 are transported via a packaging path 14 adjoining the rotating checking device 13 to a tin foil unit 16. In this tin foil unit, which, in this case, is in the form of a rotating device, the groups 15 are wrapped in a blank, more particularly, a tin foil blank, which will form an inner wrapping of the finished pack.

An intermediate unit 17 in the form of a transfer path is connected in series with the tin foil unit. This intermediate unit may be constructed in various ways according to the desired purpose. In any event, it is intended to make it possible to stop the flow of products between the tin foil unit 16 and the successive units. By means of this unit 17, a break is produced at this point which enables the heretofore-described units, which are only minimally susceptible to breakdowns, to be separated from the succeeding units which have a higher incidence of breakdowns. The break can be used for the most varied purposes, for example, to vary rhythms, etc. In the embodiments described hereinafter the intermediate device consists of a storage device for groups of cigarettes 15 enclosed in a wrapping layer.

The units which are connected after the unit 17 are a paper unit 18 in which the groups of cigarettes 15 wrapped in a tin foil layer are inserted in a paper blank or a cardboard blank. A viscose foil unit 19 is connected after the paper unit 18. This unit 19 is used to apply the outer wrapping, more particularly, a viscose foil layer. The latter two units 18 and 19 are especially susceptible to breakdowns since glue must be applied to the blanks in these units.

FIGS. 2–5 represent an intermediate unit 17 of the above-described type which simultaneously acts as a temporary storage unit 20 for the groups of cigarettes 15. Accordingly, these groups 15 provided with the inner wrapping are transferred from the tin foil unit 16 to the storage unit 20 and from the latter—possibly after storage—to the succeeding unit, namely the paper unit 18.

In this case, the tin foil unit 16 is provided with a rotating part 21 which comprises radially directed, outwardly open compartments 22. The groups of cigarettes 15 are pushed into these compartments 22 by reciprocating push rods 23. In the course thereof, the group of cigarettes 15 is pushed through the plane of a tin foil path 24 disposed at right angles thereto and a tin foil blank is wrapped about the group 15 according to the known U-folding process. The edges of the tin foil blank which project laterally and radially outwards can also be folded about the group 15 by means of thumb folding devices 25 which are known per se, a reciprocating folding rocker 26 and a stationary folding path 27. As a result, wrapped groups of cigarettes can be discharged from the rotating device 21 on its side disposed opposite to its charging side. In the embodiment represented, a rocking arm 28 with a push rod 29 are provided for this purpose. Upon ejection of the wrapped groups 15, these are moved past lateral, stationary folding deflectors 30 which fold—likewise in a manner known per se—the laterally projecting edges which have not yet been folded. The group of cigarettes 15 which has now been completely wrapped is then transferred to the storage device 20.

Figure 3:
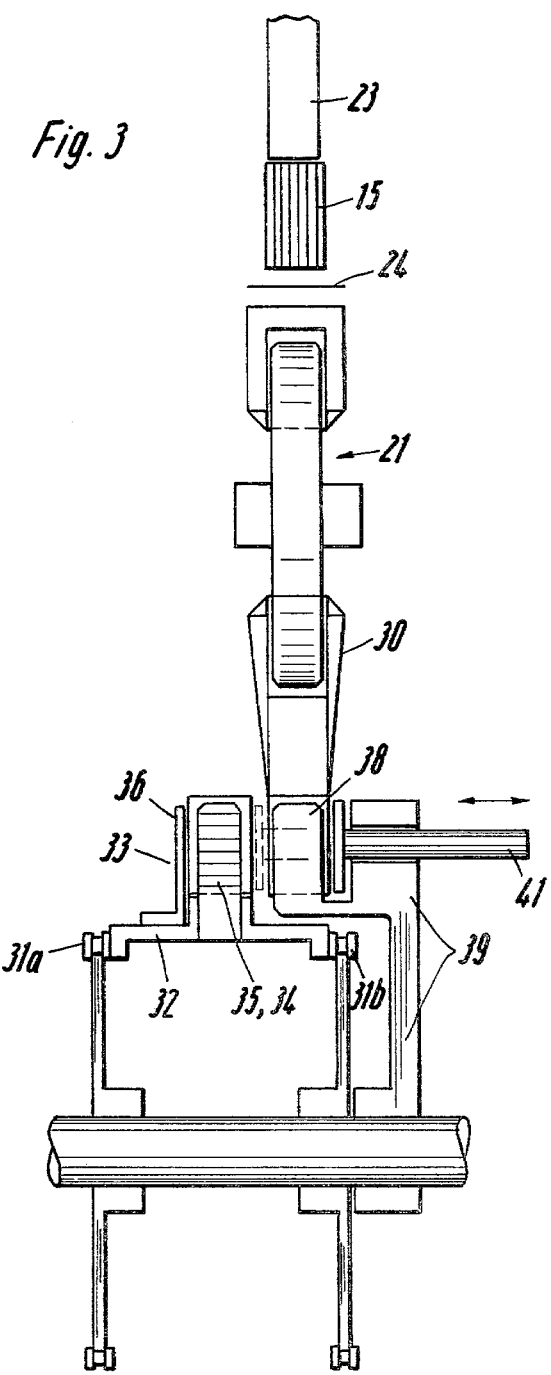
FIG. 3 is a plan view, also on an enlarged scale, of a feature of the storage device shown in FIG. 1.
Figure 4:
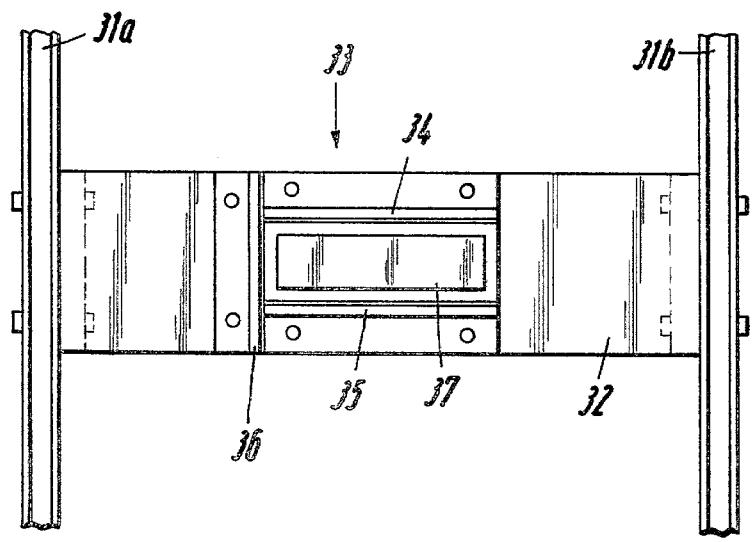
FIG. 4 is a plan view on the same scale as FIG. 3 of another feature of the storage device.

In the embodiment represented, the storage device 20 consists of an endless compartment chain 31. The structure of this chain 31 is represented in FIGS. 3 and 4. As represented, the chain 31 consists of two chain strands 31a and 31b, which are spaced apart from each other and which are interconnected by means of cross pieces 32. Projecting compartments 33 which are each designed to receive a group of cigarettes 15 are disposed on the cross pieces 32. In the embodiment represented, each compartment 33 consists of three walls 34, 35 and 36 which are secured to the cross piece 32. In the region of the bottom surface of the group 15, the cross piece 32 is provided with a slot 37.

The groups 15 can be transferred to the storage device 20 in the following manner. In the embodiment represented the groups 15 are pushed from the compartments 22 of the rotating device 21 into a transfer compartment 38 of a reciprocating rocker arm 39. The rocker arm 39 is equiaxially mounted with respect to a deflector wheel 40 about which the chain 31 is partially wound. Upon receipt of a group 15 from the discontinuously operating rotating device 21, the rocker arm 39 is in the rest position (extended lines). The rocker arm 39 is then accelerated at the speed of the chain 31 in the direction of movement of the same. When the rocker arm 39 is being displaced at the same rate as the chain 31, the group 15 is pushed by a push rod 41 which is displaced with the rocker 39 at right angles thereto, from the transfer compartment 38 of the rocker 39 to a parallel compartment 33 of the compartment conveyor 31. As is apparent from FIG. 3, the rocker 39 is disposed adjacent to the compartment conveyor 31.

The chain 31 then passes over another deflector wheel 42 in a variable spare loop 43. The spare loop 43 is formed by a displaceably mounted loop wheel 44, about which the chain 31 is passed. The size of this spare loop 43 depends on the distance between the loop wheel 44 and deflector wheel 42.

After the spare loop 43, the chain 31 passes over another deflector wheel 45 in such a way that the compartments 33 are directed radially with respect to the center point in the region of this deflector wheel 45. A rotating device 46 which forms part of the succeeding paper unit 18 is concentrically mounted with respect to the deflector wheel 45.

The prepared packs 47 are disposed in radial, outwardly open compartments of the rotating device 46. The groups 15 which are ejected from the compartments 33 of the chain 31 are pushed into the packs 47.

In this embodiment, a reciprocating insertion rocker 48 which is equiaxially mounted with the rotating device 46 and the deflector wheel 45 is provided for transferring the groups 15. The rocker which is laterally displaceable adjacent to the chain 31 is equipped with a push rod 49 in the region of the compartments 33. The insertion rocker 48 is accelerated from the rest state to the speed of the chain 31. When the push rod 49 is disposed opposite a compartment 33, the push rod 49 is displaced in a longitudinal direction. It passes through the slot 37 into the compartment 33 and thus pushes the group 15 out of the compartment 33 and into the compartment of the rotating part 46. First the push rod 49 and then the insertion rocker 48 are then moved back into the starting position.

A further deflector wheel 50 is disposed after the deflector wheel 45. From the deflector wheel 50 the chain 31 is displaced in a counter loop 51 formed by a displaceable loop wheel 53. The size of the counter loop 51 is increased or decreased to compensate for the spare loop 43, such that when the spare loop 43 is increased, the counter loop 51 is decreased and vice-versa.

At the end of the counter loop 51, the chain 31 passes over another deflector wheel 52 and from this wheel 52 to the deflector wheel 40 provided for the unit 16.

The spare loop 43 is controlled as a function of the supplying and removal of groups 15. When a breakdown occurs in the units disposed in front of the storage device 20 and the supply of groups 15 is thus interrupted, the storage device 20 is partially arrested, namely by stopping the deflector wheel 40. However, the units 18 and 19 on the discharge side continue to operate. This also means that groups 15 continue to be removed from the storage device 20. At this time the size of the spare loop 43 is continuously reduced. The loop wheel 44 moves from an upper end position to another lower end position indicated by the perforated lines, thus eliminating the spare portion. The size of the counter loop 51 is correspondingly increased as a result of the fact that the emptied region of the chain 31 is not taken up by the deflector wheel 40.

The interdependent movement of the loop wheels 44 and 53 can be produced in various ways. In the embodiment represented, the loop wheel 44 is translatorily displaced in one direction or the other on a worm nut 56 disposed on the bearing of the loop wheel 44 via a worm shaft 55 by means of a control motor 54 having a right and left-hand movement. In this case, the loop wheel 53 is biased by a tension spring 57 in the starting position corresponding to the maximum loop size.

The capacity of the storage unit 20 is a function of the possible size of the spare loop 43. The capacity of the storage unit can be increased by connecting in series a number of spare loops 43. In this case, the loop wheels 44 are advantageously connected together by way of a cross piece and are displaced in common.

In the embodiment shown in FIG. 5 the mode of operation is, in principle, identical. This embodiment comprises the following special features:

A slack section 61 of the chain 31 is formed in the direction of movement in the region after the deflector wheel 60 associated with the unit 16. In this way it is possible to drive the deflector wheel 60 discontinuously and to transfer the groups 15 to the compartments 33 of the chain 31 in the region of this deflector wheel 60 while the chain 31 is not being displaced. The chain 31 is thereafter driven continuously and the movement differences are compensated by the slack section 61.

A further special feature consists in that the spare loop 62 and the counter loop 63 are interlaced with each other. In addition, the two loop wheels 64 and 65 of the storage loop 62 and the counter loop 63 are connected together by way of a common bearing block 66. This feature is also designed to provide for the oppositely directed movement of the loop wheels 64 and 65 when a change occurs in the storage device.

What is claimed is:

1. In a cigarette packaging apparatus including a first unit for wrapping groups of cigarettes in an inner blank of tin-foil or the like to form individual blocks wherein flaps of the blank are folded but not glued, and a second unit for enclosing the blocks in an outer box of paper or the like wherein flaps of a box blank are glued together, and wherein the second unit is more susceptible to operational breakdowns and malfunctions than the first unit, the improvement characterized by:

a variable capacity buffer storage device operatively disposed in series between the first and second units to serially receive blocks from the first unit and deliver them to the second unit, said storage device comprising:
(a) an endless belt conveyor,
(b) a plurality of fixed pulleys over which the conveyor is guided,
(c) at least two movable pulleys over which the conveyor is guided to define a variable length storage loop and a variable length takeup loop in the conveyor,
(d) a plurality of generally rectangular compartments serially mounted on the conveyor for individually receiving a foil-wrapped cigarette block,
(e) each compartment including a bottom wall having a slot formed therein, and a plurality of upstanding side walls defining an entrance opening with the spacing between the walls and their dimensions being configured to closely accommodate cigarette blocks to prevent the unfolding of the foil wrapper flaps during storage and transport on the conveyor.
(f) means for moving one of the movable pulleys to decrease the length of the storage loop in response to a breakdown in the second unit wherein said first unit comprises a rotating member
(21) having radially outwardly open compartments
(22) for receiving cigarette groups (15) with a tin-foil blank member partially folded thereabout, folding means for further partially folding said tin-foil blank about said cigarette groups to form cigarette blocks, means for radially transferring said blocks from said rotating member into receiving means, means for accelerating said receiving means to the speed of said endless belt conveyor, and means for laterally transferring said blocks from said receiving and accelerating means into the conveyor compartments with an end of each blank having no flaps or folds disposed in an outwardly facing compartment opening, and wherein said second unit comprises means for individually ejecting the cigarette blocks from the conveyor compartments and delivering them to box-containing compartments of a rotating receiving means, said ejecting means including a reciprocating member mounted on a rotatable element, means for accelerating said element to the speed of said conveyor, and means for reciprocating said member to extend through said slot to eject said cigarette blocks from said conveyor compartments.

2. An apparatus as recited in claim 1, further comprising spring means mounting the other one of the movable pulleys to yieldingly compensate for changes in the length of the storage loop by correspondingly changing the length of the takeup loop in an opposite sense.

3. An apparatus as recited in claims 1 or 2, wherein the means for moving one of the movable pulleys comprises a worm shaft driven by a reversible motor.

4. An apparatus as recited in claims 1 or 2, wherein the means for laterally transferring comprises a push rod mounted for laterally reciprocable movement relative to the conveyor.

5. An apparatus as recited in claims 1 or 2, wherein each compartment has three upstanding side walls oriented in a U configuration.

6. An apparatus as recited in claim 3, wherein the means for laterally transferring comprises a push rod mounted for laterally reciprocable movement relative to the conveyor.

7. An apparatus as recited in claim 3, wherein each compartment has three upstanding side walls oriented in a U configuration.

8. An apparatus as recited in claim 4, wherein each compartment has three upstanding side walls oriented in a U configuration.

* * * * *